(12) United States Patent
Fisher

(10) Patent No.: US 8,063,141 B2
(45) Date of Patent: Nov. 22, 2011

(54) HOT MELT PRESSURE SENSITIVE ADHESIVE COMPOSITION FOR ATTACHING ROOFING MEMBRANES

(75) Inventor: Dennis K. Fisher, Brooklyn, MI (US)

(73) Assignee: ADCO Products, Inc., Michigan Center, MI (US)

( * ) Notice: Subject to any disclaimer, the term of this patent is extended or adjusted under 35 U.S.C. 154(b) by 1289 days.

(21) Appl. No.: 10/935,142

(22) Filed: Sep. 7, 2004

(65) Prior Publication Data

US 2005/0090615 A1 Apr. 28, 2005

Related U.S. Application Data

(63) Continuation-in-part of application No. 10/120,751, filed on Apr. 11, 2002, now Pat. No. 6,794,449.

(51) Int. Cl.
| | |
|---|---|
| *B32B 7/12* | (2006.01) |
| *B32B 15/04* | (2006.01) |
| *B60C 1/00* | (2006.01) |
| *B60K 15/04* | (2006.01) |
| *B60R 13/02* | (2006.01) |
| *C08G 73/10* | (2006.01) |
| *C08J 3/00* | (2006.01) |
| *C08K 3/10* | (2006.01) |
| *C08K 3/34* | (2006.01) |
| *C08K 5/00* | (2006.01) |
| *C08K 5/01* | (2006.01) |
| *C08K 5/06* | (2006.01) |
| *C08L 9/02* | (2006.01) |
| *C08L 23/00* | (2006.01) |
| *C08L 37/00* | (2006.01) |
| *C08L 51/00* | (2006.01) |
| *C08L 53/00* | (2006.01) |
| *C09B 67/00* | (2006.01) |
| *E04B 5/00* | (2006.01) |
| *E04D 1/00* | (2006.01) |
| *E04G 21/00* | (2006.01) |
| *H01B 3/44* | (2006.01) |

(52) U.S. Cl. ......... 525/88; 52/409; 52/518; 52/746.11; 428/343; 428/355 R; 428/355 EN; 428/355 BL; 524/474; 524/476; 524/493; 524/536; 524/549; 524/570; 524/371; 524/373; 524/409; 524/225; 525/95; 525/98

(58) Field of Classification Search ............... 525/88, 525/95, 98; 524/474, 476, 493, 536, 549, 524/570, 225, 371, 373, 409; 428/343, 355 R, 428/355 EN, 355 BL; 52/409, 518, 746.11
See application file for complete search history.

(56) References Cited

U.S. PATENT DOCUMENTS

| | | | | |
|---|---|---|---|---|
| 3,850,858 | A | * | 11/1974 | Park ............................. 524/271 |
| 3,932,341 | A | * | 1/1976 | Kutch et al. ................. 523/438 |
| 4,072,735 | A | * | 2/1978 | Ardemagni .................. 525/177 |
| 4,361,663 | A | | 11/1982 | Agarwal et al. |
| 4,361,672 | A | | 11/1982 | Agarwal et al. |
| 4,659,785 | A | * | 4/1987 | Nagano et al. ................ 525/324 |
| 5,026,752 | A | * | 6/1991 | Wakabayashi et al. ....... 524/271 |
| 5,163,976 | A | * | 11/1992 | Ravipati et al. ................. 51/295 |
| 5,242,727 | A | * | 9/1993 | Briddell et al. .............. 428/40.6 |
| 5,360,854 | A | | 11/1994 | Bozich, Jr. |
| H1735 | H | | 6/1998 | Hansen et al. |
| 5,859,114 | A | | 1/1999 | Davis et al. |
| 6,023,906 | A | | 2/2000 | Folkersen |
| 6,197,419 | B1 | | 3/2001 | Hyde et al. |
| 6,253,528 | B1 | | 7/2001 | Hubbard et al. |
| 6,297,324 | B1 | | 10/2001 | Briddell et al. |
| 6,794,449 | B2 | * | 9/2004 | Fisher ............................. 525/88 |

FOREIGN PATENT DOCUMENTS

JP 10081864 * 3/1998

OTHER PUBLICATIONS

English abstract of JP 10081864 of Mar. 1998.*

* cited by examiner

*Primary Examiner* — Patrick Niland

(57) ABSTRACT

An adhesive composition is provided for adhering together roofing materials such as EPDM rubber and thermoplastic polyolefin (TPO). The adhesive composition includes a rubbery polymer comprising a blend of a thermoplastic block copolymer selected from the group consisting styrene-butadiene-styrene, styrene-isoprene-styrene, styrene-ethylene-butylene-styrene, styrene-ethylene-propylene-styrene, styrene-ethylene-propylene, ethylene-propylene, and combinations thereof, and a paraffinic hydrocarbon polymer. Roofing articles incorporating the adhesive composition are also provided. The composition is a pressure sensitive adhesive that allows roofing articles to be applied in a peel and stick manner.

33 Claims, No Drawings

HOT MELT PRESSURE SENSITIVE ADHESIVE COMPOSITION FOR ATTACHING ROOFING MEMBRANES

CROSS-REFERENCE TO RELATED APPLICATIONS

This application is a continuation-in-part of U.S. application Ser. No. 10/120,751, filed Apr. 11, 2002 now U.S. Pat. No. 6,794,449.

BACKGROUND OF THE INVENTION

The present invention relates to an adhesive composition that is useful to attach roofing membranes or underlayments to a roof area. Specifically, the present invention relates to an adhesive composition that is pressure sensitive and may be utilized to apply a roofing membrane in a peel and stick manner. Additionally, the present invention relates to a roofing membrane or underlayment having the adhesive composition of the present invention applied to at least one major face.

Roof sheeting materials such as ethylene-propylene-diene terpolymer (EPDM), butyl rubber, neoprene, polyvinyl chloride, chlorinated polyethylene, thermoplastic polyolefin (TPO) and modified bitumen and the like are often used as single-ply roofing membranes or underlayments because they are well known in the art as having barrier properties against moisture. The roof sheeting materials are customarily attached to the roof area using an adhesive. The roof sheeting materials may be exposed to stresses such as roof movement, heavy winds, freeze-thaw cycles and thermal cycles. Therefore, the adhesive must be able to withstand such possible stresses.

Currently, roofing membranes and underlayments are adhered to roof decks or insulation boards utilizing a variety of methods. One such method involves the use of liquid based adhesives that employ natural and/or synthetic elastomers and resins in organic solvent systems. These liquid based adhesives do not always provide good bond strength and long-term durability. For example, if conditions during application are windy, dust or other debris may adhere to the adhesive and impair the quality of the bond. High temperatures may cause the adhesive to dry out too quickly. These environmental problems may complicate installation procedures. Additionally, liquid based adhesives often utilize organic solvents such as toluene and xylene. These solvents pose a health and fire hazard, and their use is undesirable.

Other methods of adhering roofing membranes include the use of slow drying water based adhesives. Additionally, asphalt based adhesives that must be heated to a molten state and then swabbed onto the roofing surface may also be used. However, these asphalt adhesives require special equipment and can pose a fire risk. Heat welding of thermoplastic materials and nailing have also been utilized to secure roofing membranes or underlayments to roof decks or insulation boards. Cover strips, flashings or other accessories have also been secured utilizing these processes. These processes may be extremely time consuming, hazardous or provide an inferior seam.

Thus, there is a need for an adhesive composition that effectively adheres roofing membranes or underlayments to a variety of materials with ease of application. The adhesive should provide high bond strength and excellent long-term heat aging, weathering resistance and low temperature properties while providing a moisture proof seam. Additionally, the adhesive should pose no environmental hazard.

SUMMARY OF THE INVENTION

Embodiments of the present invention meet those needs by providing an adhesive composition for roofing membranes. The adhesive composition may be applied in a peel and stick manner, and poses no environmental hazard.

In accordance with one embodiment, the adhesive composition includes a) a rubbery polymer comprising a blend of i) a thermoplastic block copolymer selected from the group consisting of styrene-butadiene-styrene, styrene-isoprene-styrene, styrene-ethylene-butylene-styrene, styrene-ethylene-propylene-styrene, styrene-ethylene-propylene, ethylene-propylene and combinations thereof and ii) a paraffinic hydrocarbon polymer; b) a compatible tackifier; and c) an amorphous polyolefin.

The paraffinic hydrocarbon polymer preferably comprises polyisobutylene. The compatible tackifier is preferably selected from the group consisting of hydrogenated polyalicyclic resins, aliphatic hydrocarbon resins, aromatic hydrocarbon resins, coumarone indene resins, esters of hydrogenated rosins, acrylic resins, and combinations thereof.

The amorphous polyolefin is preferably selected from the group consisting of amorphous polypropylene-ethylene copolymers, amorphous polypropylene/polypropylene-ethylene copolymers, amorphous polypropylene homopolymers, amorphous polyethylene homopolymers, and combinations thereof.

The adhesive composition preferably further comprises a compatible plasticizer. The plasticizer is preferably selected from the group consisting of polybutene, chlorinated paraffins, adipate esters, phthalate esters, epoxized esters, oleate esters, phosphate esters, sebacate esters, stearate esters, aromatic process oils, naphthenic process oils, paraffinic process oils, and combinations thereof.

The adhesive composition may optionally contain additional components such as antioxidants, reinforcing agents, pigments, flame retardants, and fillers.

In a preferred form, the adhesive composition includes a) a rubbery polymer comprising a blend of i) from about 20% or less by weight of the total composition of a thermoplastic block copolymer selected from the group consisting of styrene-butadiene-styrene, styrene-isoprene-styrene, styrene-ethylene-butylene-styrene, styrene-ethylene-propylene-styrene, styrene-ethylene/propylene, ethylene-propylene, and combinations thereof and ii) from about 13% or less by weight of the total composition of a paraffinic hydrocarbon polymer; b) a compatible tackifier; and c) a compatible plasticizer. The thermoplastic block copolymer may comprise about 10-15% by weight of the total adhesive composition, and the paraffinic hydrocarbon polymer may comprise about 1-8% by weight of the total adhesive composition. The adhesive composition exhibits 180° peel strength at room temperature of at least 254 grams/in (100 g/cm) when adhered to a substrate, and the adhesive composition supports a static load of at least 50 grams/in$^2$ (8 g/cm$^2$) at 70° C. for at least 96 hours when adhered to a substrate.

In accordance with another embodiment, an adhesive roofing article having a composition for adhering the roofing article to a roof area is provided. The roofing article has first and second major surfaces. The adhesive composition is applied to the first major surface, and the adhesive composition includes a) a rubbery polymer comprising a blend of i) a thermoplastic block copolymer selected from the group consisting of styrene-butadiene-styrene, styrene-isoprene-styrene, styrene-ethylene-butylene-styrene, styrene-ethylene-propylene-styrene, styrene-ethylene-propylene, ethylene-propylene, and combinations thereof and ii) a paraffinic hydrocarbon polymer; and b) a compatible tackifier. The roofing article may have a release liner adhered to the adhesive composition.

The adhesive composition of the roofing article comprises less than 20% of the total adhesive composition by weight of the block copolymer and less than 13% of the total adhesive composition by weight of the paraffinic hydrocarbon polymer. In a preferred form, the thermoplastic block copolymer comprises about 10-15% by weight of the total adhesive composition, and the paraffinic hydrocarbon polymer comprises about 1-8% by weight of the total adhesive composition. The adhesive composition exhibits 180° peel strength at room temperature of at least 254 grams/in (100 g/cm) when adhered to a substrate, and the adhesive composition supports a static load of at least 50 grams/in$^2$ (8 g/cm$^2$) at 70° C. for at least 96 hours when adhered to a substrate.

Embodiments of the present invention provide an adhesive composition with excellent tack and quick stick properties. The adhesive resists extreme heat and cold. Additionally, the adhesive may be used with a roofing article such as EPDM rubber or TPO to provide a watertight seal. The adhesive may be used in a variety of weather conditions, and no special equipment is required. Additionally, the adhesive poses no environmental hazard and does not require hazardous solvents.

Accordingly, the embodiments of the present invention provide an adhesive composition for use in adhering together sheets of roofing materials which provides ease of application, good strength, and a long term water tight seal. This, and other features and advantages will become apparent from the following detailed description and the appended claims.

DETAILED DESCRIPTION OF THE PREFERRED EMBODIMENTS

Embodiments of the present invention provide a pressure sensitive adhesive composition for roofing sheets and an adhesive roofing article comprising a roofing article and an adhesive composition. The adhesive composition allows roofing sheets to be applied in a peel and stick manner while providing good long term heat aging, weathering resistance and low temperature properties.

The adhesive composition preferably comprises a rubbery polymer comprising a blend of a thermoplastic block copolymer and a paraffinic hydrocarbon polymer such as polyisobutylene. For example, the block copolymer may be a polymer of styrene-butadiene-styrene type such as Kraton D1101, D1102, D1116, D1118, D1122, D1184 or D1300, all available from Kraton polymers; or Calprene C-401, C-411, C-411X, C-412, C-416, 419, 484, 485, 487, 500 or 501, commercial products available from Dynasol Elastomers; and Vector™ 2411, 2518, 4461, 6241 or 8505, commercially available from ExxonMobil Chemical Company. The block copolymer may be a polymer of a styrene-isoprene-styrene type such as Kraton D1107, D1111, D1112, D1113, D1117, D1119, D1124, D1125, D1193 or D1320, commercial products available from Kraton Polymers; KTR-801 or KTR-802, available from Momentum Technologies; or Vector™ 4111, 4113, 4114, 4211, 4213, 4230, or 4411, commercially available from ExxonMobil Chemical Company. The block copolymer may be polymer of a styrene-ethylene-butylene-styrene type such as Kraton G1650, G1651, G1652, G1654, G1657, G1726, G7723 or GRP6919, commercial products available from Kraton Polymers; or Calprene H-6110, 6120, 6140 or 6170, all available from Dynasol Elastomers; or S8004, S8006, S8007 or S8104, commercially available from Septon Company of America. The block copolymer may be a polymer of a styrene-ethylene-propylene-styrene type such as S2002, S2004, S2005, S2006, S2007, S2063, or S2104, commercially available from Septon Company of America. The block copolymer may also be a polymer of a styrene-ethylene-propylene type such as Kraton G1701 or G1702, commercial products available from Kraton Polymers; or S1001, commercially available from Septon Company of America. The block copolymer may be a polymer of an ethylene-propylene type such as Kraton G1750 or G1765, commercial products available from Kraton Polymers. Other suitable styrene-based block copolymers include Septon™ grades S4030, S4033, S4044, S4055 and S4077, commercially available from Septon Company of America. Additionally, the block copolymer component may be a combination of such copolymers. Generally, the adhesive composition will include less than about 20% by weight of the block copolymer. Typically, the adhesive composition will contain about 10-15% by weight of the block copolymer.

The paraffinic hydrocarbon polymer of the present adhesive composition may be a high molecular weight polyisobutylene such as Vistanex L-80, L-100, L-120 or L-140, commercial products available from ExxonMobil Chemical; or Oppanol B-50 or B-100, available from BASF Corporation. The paraffinic hydrocarbon polymer may also be a low molecular weight polyisobutylene such as CP-24, LM-MS, LM-MH, LM-H or LM-S, all available from ExxonMobil Chemical; or Opponol B-10 or B-15, commercial products available from BASF corporation; or P-12 or P-15, products available from Alcan Rubber and Chemical; or 4.0H, 4.5H, 5.0H, 5.5H or 6HT, commercial products available from Rit-Chem. Additionally, the paraffinic hydrocarbon component may be a combination of such polyisobutylenes. Generally, the paraffinic hydrocarbon component comprises less than 13% by weight of the adhesive composition. Typically, the paraffinic hydrocarbon component comprises about 1 to 8% by weight of the adhesive composition.

The adhesive composition generally contains a compatible tackifier that is generally a tackifying resin. The tackifying resin gives the composition its softness and high initial adhesivity. The resin may be a hydrogenated polyalicyclic resin such as P-95, P-115, P-125 or P-140, commercial products available from Arakawa Chemical; or Escorez 5380, 5300, 5320 or 5340, commercial products available from Exxon-Mobil Chemical; or Regalite R91, R101, R125 or S260 or Regalrez 1018, 1085, 1094, 1126, 1128, 1139, 3102, 5095 or 6108, products available from Hercules; or Eastotac H-100W, H-115W or H-130W, all available from Eastman Chemical; or Sukorez SU-100, SU-110, SU-120 or SU-130, commercial products available from Kolon Chemical. The resin may also be an aliphatic hydrocarbon resin such as Escorez 1102, 1304, 1310LC, 1315 or 1504, commercial products available from ExxonMobil Chemical; or Nevtac 10, 80, 100 or 115, products available from Neville Chemical; or Wingtack 10, 95 or Plus, all available from Goodyear Tire & Rubber; or Eastotac H-100E, H-100R, H-100L, H-115E, H-115L, H-130E, H-130R or H-130L, commercial products available from Eastman Chemical; or Adtac LV, Piccopale 100, Piccotac B, Piccotac 95 or Piccotac 115, products available from Hercules; or Hirkorez A-1100, A-1100S, C-1100, R-1100, R-1100S or T1080, all commercial products available from Kolon Chemical; or Norsolene A90, A100 or A110, all commercially available from Sartomer; or ADHM-100, a product available from Polysat. The resin may be an aromatic hydrocarbon resin such as Nevchem 70, 100, 110, 120, 130, 140 or 150, products available from Neville Chemical; or Norsolene S85, S95, S105, S115, S125, S135, S145, S155, W90, W100 or W 110, all commercially available from Sartomer; or Escorez 7105 or 7312, commercial products available from ExxonMobil Chemical; or Hikotack P-90, P-90S, P-110S, P-120, P-120S, P-120HS, P-140, P-140M, P-150 or P-160, all commercial products available from Kolon Chemical; or Picco 1104, 2100, 5120, 5130, 5140, 6085, 6100, 6115 or 9140, or Piccodiene 2215 or Piccovar AP10, AP25 or L60, products available from Hercules. The resin may also be a coumarone indene resin such as Cumar FN-10-112, P-10, P-25, R-1, R-3, R-5, R-6, R-7, R-9, R-10, R-11, R-12, R-13, R-14, R-15, R-16, R-17, R-19, R-21, R-27, R-28, R-29 or LX-509, all commercial products available from Neville Chemical; or Natrorez 10 or 25, products available from Natrochem. The resin may be an ester of hydrogenated rosin such as Foral 85 or 105 or Pentalyn A or H or Hercolyn D or Stabelite Ester 10 or Abalyn, commercial products available from Hercules; or Komotac KF-462S, a product available from Momentum Technologies. The resin may also be acrylic, such as Acronol 4F, 7F, 30F, 80F, 81F, 85F, 500F, 880F and LR8820, commercially available from BASF Corporation; or Acryloid (Paraloid®) A-11, A-12, A-21, B-44, B-48N, B-60, B-64, B-66, B-72 and B-82, commercially available from Rohm & Haas.

Additionally, the tackifying resin component of the present invention may be mixtures of these or other suitable resins. The tackifying resin generally comprises less than about 40% by weight and more than about 14% by weight of the adhesive composition.

The pressure sensitive adhesive composition may also contain an amorphous polyolefin. The amorphous polyolefin is a flow modifier. The amorphous polyolefin may be amorphous polypropylene-ethylene copolymers such as E1003, E1060 or E100, commercial products available from Eastman Chemical. The amorphous polyolefin may also be an amorphous polypropylene/polypropylene-ethylene copolymer such as M1010, M1018, M1020, M1025 or M1030, commercial products available from Eastman Chemical. The amorphous polyolefin may be an amorphous polypropylene homopolymer such as P1010 or P1023, commercial products available from Eastman Chemical; or Polytac R-500, a commercial product available from Crowley Chemical. The amorphous polyolefin may be an amorphous polyethylene homopolymer such as Epolene C-10, C-13, C-14, C-15, C-17, N-10, N-11, N-14, N-15, N-20, N-21 and N-34, commercial products available from Eastman Chemical; or AC-6, AC-7, AC-8, AC-9, AC-617, AC-712, AC-715, AC-725, AC-735 or AC-1702, commercial products available from Honeywell. The amorphous polyolefin may be an ethylene/vinyl acetate copolymer such as Elvax 40-W, 140-W, 150-W, 205-W, 210-W, 220-W, 240-W, 250-W, 260, 265, 310, 350, 360, 410, 420, 450, 460, 470, 550, 560, 650, 660, 670, 750, 760 or 770, commercial products available from DuPont. Additionally, the amorphous polyolefin may comprise mixtures of the above types. Generally, the amorphous polyolefin comprises about 0-50% by weight of the adhesive composition.

The adhesive composition may contain a compatible plasticizer. The plasticizer may also function as a tackifier and give the composition its softness and high initial adhesivity. The plasticizer may also impart flame retardancy. Examples of suitable plasticizing agents include polybutene such as Indopol H-100, H-300, H-1500 or H-1900, commercial products available from Amoco Chemical; or Parpol 700, 950, 1300, 2200 or 2500, commercial products available from ExxonMobil Chemical; and chlorinated paraffin such as Chlorowax LV, 40, 41 SW, 50, 45, 45-LV, 50-LV, 100, S-45, S-52, 500-C, 57-60, 60-70, or 70-200, commercial products available from Oxychem; and adipate esters such as Dioctyl Adipate (DOA) and Diisodecyl Adipate (DIDA); and phthalate esters such as Alkyl Benzyl Phthalate (DBP), Diethyl Phthalate (DEP), Diisodecyl Phthalate (DIDP), Dimethyl Phthalate (DMP) Dioctyl Phthalate (DOP) and Dundecyl Phthalate (DUP); and epoxidized esters such as Epoxidized Linseed Oil and Epoxidized Soy Oil; and oleate esters such as Butyl Oleate and Decyl Oleate; and phosphate esters, sebacate esters, stearate esters, and suitable process oils which include, but are not limited to, aromatic process oils such as Flexon® 340 and 391, commercially available from ExxonMobil Chemical; or Sundex® 740T, 750T, 780T, 790, 790T, 7135T, 8125 and 8600T, commercially available from Sun Oil Company; and naphthenic process oils such as Flexon® 580, 620, 641, 644, 650, 660, 676, 680, 735, 765, 766 and 785, commercially available from ExxonMobil Chemical; or Shellflex® 371, 702, 734, 2371, 3131, 3211, 3251, 3271, 3311, 3371 and 3681, commercially available from Shell Oil Chemical; or Circosol® 304, 306, 410, 450, 4240 and Sunthene® 204, 220, 255, 306, 311, 380, 410, 450, 4130 and 4240, commercially available from Sun Oil Company; and paraffinic process oils such as Flexon® 815, 845, 865, and 885, commercially available from ExxonMobil Chemical; or Shellflex® 1210, 1310, 1790, 2210, 2310, 2680, 2790, 5680 and 6371, commercially available from Shell Oil Company; or Sunpar® 107, 110, 115, 120, 130, 150, 2170, 2280, LW104, LW105, LW107, LW110 and LW120, commercially available from Sun Oil Company; and mixtures thereof. The plasticizer generally comprises less than about 50% by weight of the adhesive composition.

The adhesive composition may also contain an antioxidant. Suitable antioxidants include, but are not limited to, Irganox 1010, 1035, 1076, 1520, or 3114, commercial products available from Ciba-Geigy; BNX-1010, BNX-2000, or BNX-3114, commercial products available from Mayzo, Inc.; or Wingstay C, K, L, S or T, commercial products available from Goodyear Tire & Rubber; or combinations thereof.

The adhesive composition may also contain a reinforcing agent. The reinforcing agent may be a hydrophilic fumed silica such as Aerosil 90, 130, 150, 200, 300 or 380, commercial products available from Degussa; or Cab-O-Sil H-5, HS-5, L-90, LM-130, LM-150, M-5, PTG, MS-55 or EH-5, commercial products available from Cabot. The reinforcing agent may comprise hydrophobic fumed silica such as Aerosil R202, R805, R812, R812S, R972, R974 or US202, commercial products available from Degussa; or Cab-O-Sil TS-530, TS-610 or TS-720, all commercial products available from Cabot. The reinforcing agent may be a hydrated amorphous precipitated silica such as Hi-Sil 132, 135, 210, 233, 243LD, 255, 532EP, 752, 900, 915 or 2000 from PPG Industries; or Hubersil162, 162LR, 1612, 1633, 1714, 1743, 4151H, all commercial products available from J. M. Huber; or Garamite 1958 available from Southern Clay Products. Additionally, the reinforcing agent may be a combination of the reinforcing agents above.

The adhesive composition may also include fillers such as, but not limited to, aluminum silicate, barium sulfate, calcium carbonate, calcium sulfate, cellulose fiber, glass microspheres (solid), hollow microspheres, hydrous aluminum silicate (clay), hydrated magnesium silicate talc, metallic oxide silica, ground mica, powdered coal, peanut shell flour, wollastonite and wood flour.

The adhesive composition may contain a minor portion of pigments. The pigments may include titanium dioxide to make the product white or light in color or carbon black or coal filler to make the product black or dark in color and mixtures thereof.

The adhesive composition may further include antimony oxide or decabromodiphenyl oxide such as Saytex 102E, a commercial product available from Albermarle; or tetradecabromodiphenoxybenzene such as Saytex 120 from Albermarle; or hexabromocyclododecane such as Saytex HP-900 available from Albermarle; or ethane-1,2-bis(pentabromophenyl) such as Saytex 8010, a commercial product available from Albermarle; or ethylenebistetrabromophthalimide such as Saytex BT-93 from Albermarle; and mixtures thereof to provide flame retardancy.

The ingredients of the pressure sensitive adhesive composition are generally prepared by mixing the components together in a conventional double-arm sigma blade mixer at a temperature of about 150° C. to about 205° C. until a homogenous mixture is obtained. The mixing time is generally about four hours. The resulting PSA composition exhibits a 180° peel strength at room temperature of at least 445 grams per inch (g/in) (175 g/cm) when adhered to plywood, 254 g/in (100 g/cm) when adhered to wood fiber board, and 254 g/in (100 g/cm) when adhered to paper faced isocyanurate insulation board as measured by the ASTM D 3330 test method. Typically, the adhesive compositions exhibit a 180° peel strength at room temperature of about 2268 g/in (893 g/cm) on aluminum, 2721 g/in (1071 g/cm) on concrete, 1814 g/in (714 g/cm) on plywood, 1814 g/in (714 g/cm) on wood fiberboard, 907 g/in (357 g/cm) on oriented strand board, 453 g/in (178 g/cm) on paper faced isocyanurate insulation board, and 1814 g/in (714 g/cm) on foil faced isocyanurate insulation board. The compositions support a static load of at least 50 grams/in$^2$ (8 g/cm$^2$) at 70° C. for a minimum of 96 hours when bonded to any desired substrate. The adhesive is suitable for use at temperatures between about −40° C. to 122° C.

The adhesive compositions do not require the use of organic solvents, and the adhesives pose no environmental hazard. Additionally, the adhesive resists water exposure. These properties make the adhesive compositions useful for bonding roofing materials that are subject to extreme heat, cold, and water exposure. Generally, the surface to which the adhesive compositions are to be applied should be clean, dry, free of loose or foreign materials, and free of surface contaminants such as grease or oil.

An embodiment of the present invention also includes a roofing article incorporating the adhesive composition. To form the roofing article, the adhesive is hot applied to the desired substrate using any conventional means such as roll, slot die, spray, metering rod or extrusion coating. The adhesive is typically hot applied to the substrate at a temperature between about 175° C. to 205° C. For purposes of defining and describing the present invention, it is noted that a roofing article comprises films, tapes, sheets and the like that are generally used to form roofing membranes or underlayments. The roofing article may be comprised of materials that are used in the commercial and residential roofing industry as waterproofing membranes or underlayments. Such materials include, but are not limited to, EPDM rubber, thermoplastic polyolefin (TPO), or reprocessed tire treads. Generally, the roofing membrane or underlayment is single-ply.

The adhesive is applied to the roofing article on at least one major face of the substrate. A release liner may be placed over the adhesive. The release liner is removed at the jobsite immediately prior to the application of the roofing article to the roof area. The roofing article is then placed in the desired position and minimal pressure is applied to facilitate adhesion of the roofing article to the roof area. The adhesive provides an immediate bond that resists weathering and heat aging. No special equipment is required during installation of the roofing article.

EXAMPLE 1

The compositions and amounts listed below were charged to a conventional double-arm sigma blade mixer and blended for a period of four hours. The resulting compositions were then hot applied to an underlayment or roofing material at a temperature of between 175° C. to 205° C. The resulting compositions had high initial adhesivity and excellent tack. The compositions were measured to resist a dead load of 50 g at 700° C. for 96 hours. Pass indicates that there was no slippage.

|  | Grams | | | |
| --- | --- | --- | --- | --- |
|  | 1 | 2 | 3 | 4 |
| Compound Description | | | | |
| Block Copolymer | 200 | 200 | 200 | 200 |
| Polyisobutylene | 20 | 15 | 20 | 130 |
| Amorphous Polyolefin | 110 | 100 | 100 | — |
| Tackifiers | 590 | 600 | 570 | 520 |
| Plasticizer | 625 | 625 | 625 | 800 |
| Antioxidant | 10 | 10 | 10 | 10 |
| Reinforcing Agent | 10 | 10 | 10 | 10 |
| Pigment | — | — | — | 1.5 |
| Flame Retardant | 22 | 22 | 22 | — |
| Physical Properties | | | | |
| Dead Load 50 g on EPDM | Pass | Pass | Pass | Pass |
| Dead Load 50 g on Plywood | Pass | Pass | Pass | Pass |

The peel strength of composition 4 in Example 1 was measured. The peel strength was measured after 24 hours at room temperature. The adhesive was applied to 45 mm thick TPO sheet membrane and a 35 mils thick roofing underlayment. The membranes were 2.54 cm wide (1 in) wide and about 30.5 cm (12 in) long. The 180° peel strength was measured for various substrates as reported below. The tape was pulled at a rate of 5 cm (2 in) per minute.

|  | Peel Strength - g/in | |
| --- | --- | --- |
| Substrate | TPO sheet membrane | Roof Underlayment |
| Plywood | 1814 | 1814 |
| Very Rough Oriented Strand Board (OSB) | 861 | 1224 |
| Rough OSB | 1179 | 1769 |
| Smooth OSB | 1451 | 1496 |
| Wood Fiber Board | 997 | 1769 |
| Foil Faced Isocyanurate | — | 2041 |
| Paper Faced Isocyanurate | 340 | — |

EXAMPLE 2

The compositions and amounts listed below were prepared and applied as in Example 1.

|  | Grams | | | |
|---|---|---|---|---|
|  | 1 | 2 | 3 | 4 |
| Compound Description | | | | |
| Block Copolymer | 200 | 200 | 200 | 312 |
| Polyisobutylene | 30 | 30 | 130 | — |
| Amorphous Polyolefin | 100 | 100 | — | — |
| Tackifiers | 520 | 520 | 520 | 700 |
| Plasticizer (polybutene) | — | 700 | — | — |
| Plasticizer (process oil) | 350 | — | 1000 | 312 |
| Antioxidant | 10 | 10 | 10 | 11 |
| Reinforcing Agent | 10 | 10 | 10 | — |
| Pigment | 1 | 1 | 1 | 1 |
| Physical Properties | | | | |
| Dead Load 50 g on Plywood | Pass | Pass | Pass | Pass |
| Dead Load 50 g on TPO | Pass | Pass | Pass | Pass |

The peel strength of all four compositions was then measured as in Example 1 and the results are shown below.

|  | Peel Strength - g/in | |
|---|---|---|
|  | TPO sheet membrane | Roof Underlayment |
| Composition 1 Substrate | | |
| Plywood | 165 | 150 |
| Rough oriented strand board (OSB) | 123 | 108 |
| Smooth OSB | 144 | 125 |
| Wood Fiber Board | 110 | 105 |
| Foil Faced Isocyanurate | 453 | 363 |
| Composition 2 | | |
| Plywood | 1587 | 1450 |
| Rough oriented strand board (OSB) | 453 | 272 |
| Smooth OSB | 508 | 323 |
| Wood Fiber Board | 318 | 318 |
| Foil Faced Isocyanurate | 3084 | 2630 |
| Composition 3 | | |
| Plywood | 318 | 635 |
| Rough oriented strand board (OSB) | 318 | 227 |
| Smooth OSB | 408 | 408 |
| Wood Fiber Board | 363 | 318 |
| Foil Faced Isocyanurate | 453 | 318 |
| Composition 4 | | |
| Plywood | 885 | 805 |
| Rough oriented strand board (OSB) | 490 | 450 |
| Smooth OSB | 743 | 680 |
| Wood Fiber Board | 384 | 365 |
| Foil Faced Isocyanurate | 453 | 400 |

EXAMPLE 3

The compositions and amounts listed below were prepared and applied as in Example 1.

|  | Grams | |
|---|---|---|
|  | 1 | 2 |
| Compound Description | | |
| Block Copolymer | 200 | 200 |
| Polyisobutylene | 135 | 135 |
| Tackifiers | 525 | 525 |
| Plasticizer (polybutene) | 750 | 750 |
| Plasticizer (dioctyl adipate) | 50 | 100 |
| Antioxidant | 10 | 10 |
| Reinforcing Agent | 10 | — |
| Pigment | 1 | 1 |
| Physical Properties | | |
| Dead Load 50 g on Plywood | Pass | Pass |
| Dead Load 50 g on TPO | Pass | Pass |

The peel strength of both compositions was then measured as in Example 1, and the results are shown below.

|  | Peel Strength - g/in | |
|---|---|---|
|  | TPO sheet membrane | Roof Underlayment |
| Composition 1 Substrate | | |
| Plywood | 1225 | 1270 |
| Rough oriented strand board (OSB) | 544 | 317 |
| Smooth OSB | 408 | 907 |
| Wood Fiber Board | 227 | 227 |
| Foil Faced Isocyanurate | 725 | 1180 |
| Composition 2 | | |
| Plywood | 408 | 454 |
| Rough oriented strand board (OSB) | 181 | 317 |
| Smooth OSB | 227 | 318 |
| Wood Fiber Board | 272 | 907 |
| Foil Faced Isocyanurate | 998 | 1270 |

EXAMPLE 4

The compositions and amounts listed below were prepared and applied as in Example 1.

|  | Grams | | |
|---|---|---|---|
|  | 1 | 2 | 3 |
| Compound Description | | | |
| Block Copolymer | 130 | 200 | 140 |
| Calcium carbonate | 550 | — | 600 |
| Hydrous aluminum silicate | — | 400 | — |
| Amorphous Polyolefin | — | 50 | — |
| Tackifiers | 487 | 490 | 490 |
| Plasticizer | 970 | 900 | 1200 |
| Antioxidant | 6 | 7 | 7 |

-continued

| | Grams | | |
|---|---|---|---|
| | 1 | 2 | 3 |
| Reinforcing Agent | — | 5 | — |
| Pigment | 2 | 2 | 2 |
| Physical Properties | | | |
| Dead Load 50 g on Plywood | Pass | Fail | Pass |

The peel strength of all compositions was then measured as in Example 1. The adhesive was applied to a 35 mils thick roofing underlayment.

| | Peel Strength - g/in - Roof Underlayment | | |
|---|---|---|---|
| Substrate | Composition 1 | Composition 2 | Composition 3 |
| Plywood | 1769 | 181 | 499 |
| Rough oriented strand board (OSB) | 1043 | 181 | 499 |
| Smooth OSB | 1360 | 227 | 635 |
| Wood Fiberboard | 680 | 136 | 363 |
| Foil Faced Isocyanurate | 1406 | 272 | 816 |

While certain representative embodiments and details have been shown for purposes of illustrating the invention, it will be apparent those skilled in the art that various changes in the methods and apparatus disclosed herein may be made without departing from the scope of the invention, which is not to be considered limited to what is described in the specification.

What is claimed is:

1. A hot melt pressure sensitive adhesive composition for adhering roofing sheets to a roof area comprising: a) a thermoplastic block copolymer selected from the group consisting of styrene-butadiene-styrene, styrene-isoprene-styrene, styrene-ethylene-propylene-styrene, a styrene-ethylene-propylene block copolymer and combinations thereof; b) from about 1 to 8% by weight of polyisobutylene having a viscosity average molecular weight from 750,000 to 2,340,000; c) a compatible tackifier; d) an amorphous polyolefin; e) a filler; and f) a flame retardant.

2. The adhesive composition as claimed in claim 1 wherein said tackifier is selected from the group consisting of hydrogenated polyalicyclic resins, aliphatic hydrocarbon resins, aromatic hydrocarbon resins, coumarone indene resins, esters of hydrogenated rosins, acrylic resins, and combinations thereof.

3. The adhesive composition as claimed in claim 1 wherein said amorphous polyolefin is selected from the group consisting of amorphous polypropylene-ethylene copolymers, amorphous polypropylene/polypropylene-ethylene copolymers, amorphous polypropylene homopolymers, amorphous polyethylene homopolymers and combinations thereof.

4. The adhesive composition as claimed in claim 1 further comprising an antioxidant.

5. The adhesive composition as claimed in claim 1 further comprising a compatible plasticizer.

6. The adhesive composition as claimed in claim 5 wherein said plasticizer is selected from the group consisting of polybutene, chlorinated paraffin, adipate esters, phthalate esters, epoxidized esters, oleate esters, phosphate esters, sebacate esters, stearate esters, aromatic process oils, naphthenic process oils, paraffinic process oils, and combinations thereof.

7. The adhesive composition as claimed in claim 1 further comprising a reinforcing agent selected from a group consisting of hydrophilic fumed silica, hydrophobic fumed silica, and hydrated amorphous precipitated silica.

8. An adhesive roofing article having a composition for adhering the roofing article to a roof area comprising: a roofing article having first and second major surfaces; and an adhesive composition applied to said first major surface of said roofing article, wherein said adhesive composition comprises: a) thermoplastic block copolymer selected from the group consisting of styrene-butadiene-styrene, styrene-isoprene-styrene, styrene-ethylene-propylene-styrene, a styrene-ethylene-propylene block copolymer and combinations thereof; b) from about 1 to 8% by weight of polyisobutylene having a viscosity average molecular weight from 750,000 to 2,340,000; c) a compatible tackifier; and d) a flame retardant.

9. The article as claimed in claim 8 further comprising a release liner adhered to said adhesive composition.

10. The article as claimed in claim 8 wherein said paraffinic hydrocarbon polymer is polyisobutylene.

11. The article as claimed in claim 8 wherein said tackifier is selected from the group consisting of hydrogenated polyalicyclic resins, aliphatic hydrocarbon resins, aromatic hydrocarbon resins, coumarone indene resins, esters of hydrogenated rosins, acrylic resins, and combinations thereof.

12. The article as claimed in claim 8 further comprising an amorphous polyolefin.

13. The article as claimed in claim 12 wherein said amorphous polyolefin is selected from the group consisting of amorphous polypropylene-ethylene copolymers, amorphous polypropylene/polypropylene-ethylene copolymers, amorphous polypropylene homopolymers, amorphous polyethylene homopolymers and combinations thereof.

14. The article as claimed in claim 8 wherein said adhesive composition further comprises an antioxidant.

15. The article as claimed in claim 8 wherein said adhesive composition further comprises a compatible plasticizer.

16. The article as claimed in claim 15 wherein said plasticizer is selected from the group consisting of polybutene, chlorinated paraffin, adipate esters, phthalate esters, epoxidized esters, oleate esters, phosphate esters, sebacate esters, stearate esters, aromatic process oils, naphthenic process oils, paraffinic process oils, and combinations thereof.

17. The article as claimed in claim 8 wherein said adhesive composition further comprises a reinforcing agent.

18. The adhesive composition as claimed in claim 17 wherein said reinforcing agent is selected from a group consisting of hydrophilic fumed silica, hydrophobic fumed silica, and hydrated amorphous precipitated silica.

19. The article as claimed in claim 8 wherein said adhesive composition exhibits 180° peel strength at room temperature of at least 254 grams/in when adhered to a substrate.

20. The article as claimed in claim 8 wherein said adhesive composition supports a static load of at least 50 grams/in$^2$ at 70° C. for at least 96 hours when adhered to a substrate.

21. The hot melt pressure sensitive adhesive composition of claim 1 wherein the flame retardant is selected from the group consisting of antimony oxide, decabromodiphenyl oxide, tetradecabromodiphenoxybenzene, hexabromocyclododecane, ethane-1,2-bis(pentabromophenyl), ethylenebistetrabromophthalimide, and mixtures thereof.

22. The adhesive roofing article of claim 8 wherein the flame retardant is selected from the group consisting of antimony oxide, decabromodiphenyl oxide, tetradecabromodiphenoxybenzene, hexabromocyclododecane, ethane-1,2-bis(pentabromophenyl), ethylenebistetrabromophthalimide, and mixtures thereof.

23. A hot melt pressure sensitive adhesive composition for adhering roofing sheets to a roof area comprising: a) a thermoplastic block copolymer selected from the group consisting of styrene-butadiene-styrene, styrene-isoprene-styrene, styrene-ethylene-propylene-styrene, a styrene-ethylene-propylene block copolymer and combinations thereof; b) from about 1 to 8% by weight of polyisobutylene having a viscosity average molecular weight from 750,000 to 2,340,000; c) from 31 to 38% by weight of a compatible tackifier; d) from 6 to 8% by weight of an amorphous polyolefin; e) from 6 to 7% by weight of a reinforcing agent selected from a group consisting of hydrophilic fumed silica, hydrophobic fumed silica, and hydrated amorphous precipitated silica; f) from 6 to 7% by weight of an antioxidant; g) from 31 to 41% by weight of a plasticizer; h) from 0.01 to 0.1% by weight of a pigment; and i) a flame retardant.

24. The hot melt pressure sensitive adhesive composition of claim 23 further comprising a filler selected from a group consisting of aluminum silicate, barium sulfate, calcium carbonate, calcium sulfate, cellulose fiber, solid glass microspheres, hollow glass microspheres, hydrous aluminum silicate, hydrated magnesium silicate, metallic oxide silica, ground mica, powdered coal, peanut shell flour, wollastonite and wood flour.

25. The adhesive composition as claimed in claim 23 wherein said tackifier is selected from the group consisting of hydrogenated polyalicyclic resins, aliphatic hydrocarbon resins, aromatic hydrocarbon resins, coumarone indene resins, esters of hydrogenated rosins, acrylic resins, and combinations thereof.

26. The adhesive composition as claimed in claim 23 wherein said amorphous polyolefin is selected from the group consisting of amorphous polypropylene-ethylene copolymers, amorphous polypropylene/polypropylene-ethylene copolymers, amorphous polypropylene homopolymers, amorphous polyethylene homopolymers and combinations thereof.

27. The adhesive composition as claimed in claim 23 wherein said plasticizer is selected from the group consisting of polybutene, chlorinated paraffin, adipate esters, phthalate esters, epoxidized esters, oleate esters, phosphate esters, sebacate esters, stearate esters, aromatic process oils, naphthenic process oils, paraffinic process oils, and combinations thereof.

28. The hot melt pressure sensitive adhesive composition of claim 1 comprising less than about 20% by weight of the thermoplastic block copolymer.

29. The hot melt pressure sensitive adhesive composition of claim 1 comprising about 10-15% by weight of the thermoplastic block copolymer.

30. The adhesive roofing article of claim 8 comprising less than about 20% by weight of the thermoplastic block copolymer.

31. The adhesive roofing article of claim 8 comprising about 10-15% by weight of the thermoplastic block copolymer.

32. The adhesive roofing article of claim 23 comprising less than about 20% by weight of the thermoplastic block copolymer.

33. The adhesive roofing article of claim 23 comprising about 10-15% by weight of the thermoplastic block copolymer.

* * * * *